United States Patent
Faulkner et al.

(10) Patent No.: US 11,612,138 B1
(45) Date of Patent: Mar. 28, 2023

(54) PROTECTIVE WOUND COVERING GARMENT FOR ANIMALS

(71) Applicant: 630 IDM, Ltd., North Salem, NY (US)

(72) Inventors: Michele Faulkner, New York, NY (US); Irina Ponedelnik, Brooklyn, NY (US)

(*) Notice: Subject to any disclaimer, the term of this patent is extended or adjusted under 35 U.S.C. 154(b) by 110 days.

(21) Appl. No.: 17/175,214

(22) Filed: Feb. 12, 2021

Related U.S. Application Data

(63) Continuation of application No. 16/188,856, filed on Nov. 13, 2018, now abandoned.

(60) Provisional application No. 62/585,038, filed on Nov. 13, 2017.

(51) Int. Cl.
*A01K 13/00* (2006.01)
*A61D 9/02* (2006.01)
*A41D 1/04* (2006.01)

(52) U.S. Cl.
CPC ........ *A01K 13/006* (2013.01); *A41B 2400/52* (2013.01); *A41D 1/04* (2013.01); *A61D 9/02* (2013.01)

(58) Field of Classification Search
CPC ....... A01K 13/006; A01K 13/00; A01K 23/00
See application file for complete search history.

(56) References Cited

U.S. PATENT DOCUMENTS

| | | | | |
|---|---|---|---|---|
| 6,234,117 B1* | 5/2001 | Spatt | .................... | A01K 13/006 54/79.2 |
| 8,707,910 B1* | 4/2014 | Koll | .................... | A01K 13/006 119/850 |
| 8,733,296 B1* | 5/2014 | Douglas | ............... | A01K 13/006 119/856 |
| 2011/0226193 A1* | 9/2011 | Williams | ............... | A01K 23/00 119/850 |
| 2012/0174875 A1* | 7/2012 | Wetzel | ................. | A01K 13/006 119/838 |
| 2012/0227679 A1* | 9/2012 | Bishop | ................. | A01K 13/006 119/850 |
| 2014/0318478 A1* | 10/2014 | Cruz | .................... | A01K 13/006 119/850 |
| 2020/0367472 A1* | 11/2020 | Zarras | ................. | A01K 13/006 |

* cited by examiner

*Primary Examiner* — Kristen C Hayes
(74) *Attorney, Agent, or Firm* — Alston & Bird LLP

(57) ABSTRACT

A protective garment for an animal includes a torso portion and an elongated groin strip extending rearwardly from a rear of the torso portion. The torso portion has a bottom, a first side and a second side, and a torso closure configured to wrap around an animal's torso when the garment is placed on the animal, and is configured to secure the first and second sides to each other at the animal's back. The elongated groin strip has an end portion and a length sufficient for the groin strip to wrap around a rear end of the animal and to be secured to the torso forward of the tail. The groin strip has a transition portion with an opening positioned and sized to permit the animal's tail to pass there through and to allow the animal to freely defecate while the garment is worn.

20 Claims, 11 Drawing Sheets

FIGURE 2
FIGURE 3
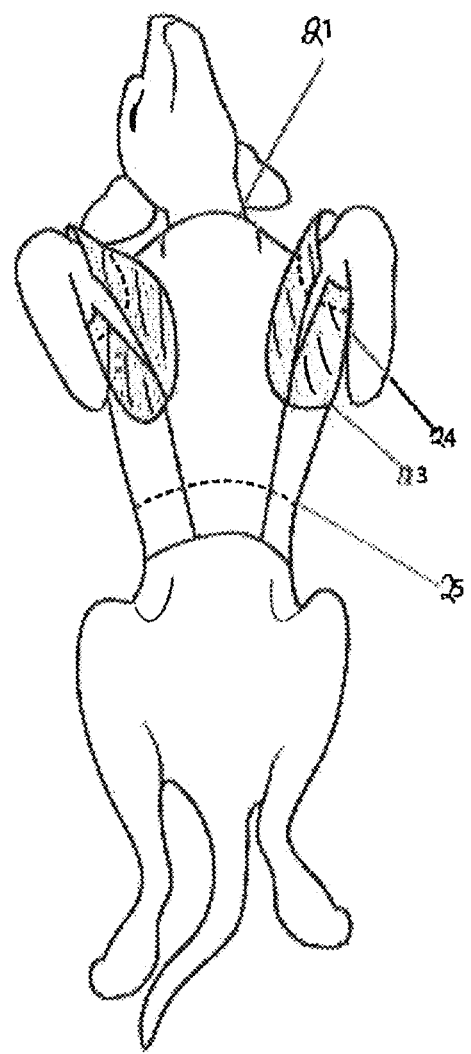
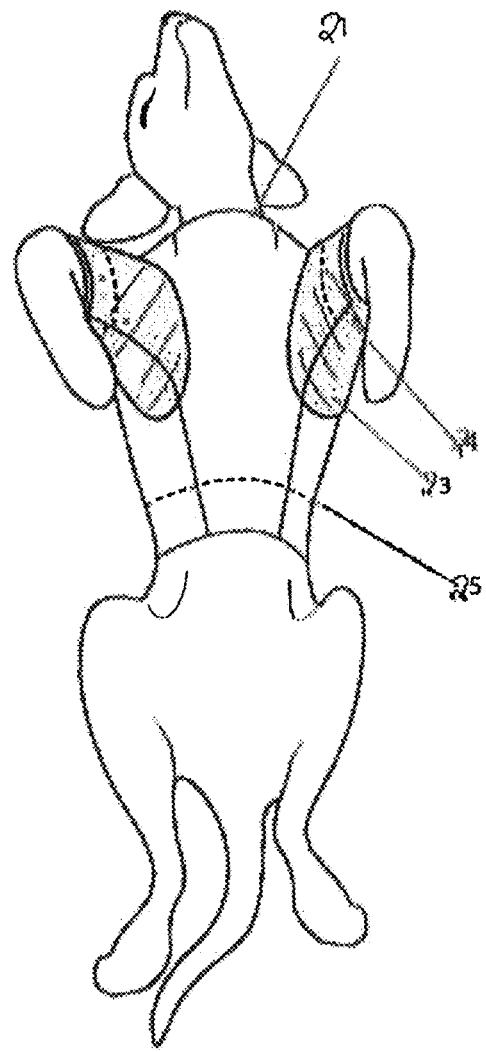

PROTECTIVE WOUND COVERING GARMENT FOR ANIMALS

CROSS-REFERENCE TO RELATED APPLICATION

This application is a continuation of U.S. application Ser. No. 16/188,856 filed on Nov. 13, 2018 which claims benefit of U.S. Provisional Patent Application Ser. No. 62/585,038, filed on Nov. 13, 2017 in the U.S.P.T.O., the disclosure of which is incorporated by reference herein in its entirety.

TECHNICAL FIELD

The present invention relates to a garment for animals, and more particularly, to a protective wound covering garment for animals.

DISCUSSION OF THE RELATED ART

Animals, such as pet dogs and cats, often need to undergo medical procedures and can experience corporal trauma, contract dermatological conditions and other circumstances which results in superficial wounds/sores/abrasions, (the "Conditions"). Following the procedure, time is required for the treatment areas to heal. Similar injuries can be introduced separate from a medical procedure, such as in interactions with other pets. While such Conditions heal, it is important to prevent the pet from licking, chewing, scratching and dirtying the Conditions to prevent aggravating the injury and to promote quicker healing. It is also important that the pet be comfortable.

Conventional bandages and wraps that are applied to such Conditions can be messy and difficult for pet owners to properly secure to the animal. In addition, the pet may still be able to lick or chew the area. The pet may also be able to remove the bandage raising the risk of the pet aggravating the Conditions and also the risk that the pet might eat the bandage itself.

A conventional solution to these problems is a pet cone (or similar device) that attaches around the animal's neck to provide a physical barrier around the head that prevents the animal from biting or licking its body. However, some pets will not eat or drink while the cone is in place. The wide mouth of the cone can also interfere with the pet's vision and mobility. The cone also is visually unappealing to the pet's owner and can be very uncomfortable for the pet.

There is therefore a need for a protective garment covering that can be easily applied by a pet owner to protect the Conditions and prevent the animal from aggravating the Conditions by licking or chewing at it. In addition, it would be advantageous for the garment to be easy to adjust so that a single size garment can be snugly and securely applied to dogs, cats, and other pets of various sizes. It would also be advantageous for such a covering to have minimal impact on the pet's mobility, be visually appealing, and to be sufficiently inexpensive so as to be disposable

SUMMARY

These and other issues are addressed by a step-in garment as disclosed in various embodiments herein which serves as a barrier to prevent an animal from directly licking or chewing at Conditions also helps keep the protected area(s) clean so as to reduce the chance of infection. The garment is easily put on and removed to ensure minimum discomfort for the wounded pet being treated. In various embodiments, the garment can be configured with sleeves for only the front legs, with sleeves only for the back legs, or sleeves for all legs. A vest version can also be provided when leg covering is not needed.

In an embodiment, the garment can be adjustable in size to allow for a single size garment (such as small, medium, or large) to be better fit to an animal. In particular embodiments, portions of the garments include cut- or tear-away portions to allow the size of the garment to be further customized by a user.

In a particular embodiment the garment includes two different non-woven fabric types: (i) a polypropylene fabric, such as SMS fabric, which allows airflow but is substantially impermeable to dust and dirt and which is used for the torso and (b) cohesive nonwoven cotton panels and sleeves which give the garment more flexibility and thus comfort for the pet. Preferably one or both fabric materials are at least slightly elastic to provide a snug fit while accommodating normal movement and breathing motions. In another embodiment, the majority of the garment includes an elastic multi-layer material with a liquid repellent outer surface, such as non-woven polypropylene, and an inner absorbent layer, such as a cellulous material. The elasticity can be between 5% and 20%.

A groin strip can extend from the bottom of the torso portion to wrap around the back of the animal and be secured to an upper part of the garment on the animal's back. The groin strip can have a slit, perforations, or other opening positioned and configured to allow an animal's tail to pass through. In a particular embodiment, the groin strip has an opening through which the animal's tail can pass and that is large enough and positioned to allow the animal to defecate and allow female animals to urinate without soiling the garment. A second opening can be provided in the groin strip or appropriate lower portion of the torso region to allow male dogs to urinate without soiling the garment.

The garment is can be provided in single-garment packages which can be easily distributed in single or multi-packs and easily transported by a pet's owner and opened on an as-needed basis. In one embodiment, the garment can be pre-sterilized and supplied in a sealed tear-open pouch.

In an embodiment, a protective garment for an animal includes a torso portion configured to cover a torso of an animal. The torso portion includes a central section including an edge contour defining a pair of front leg openings and a neck opening, a first closure section attached to a first side edge of the central section, and a second closure section attached to a second side edge of the central section, the second edge being at an opposite side of the central section from the first edge. The first and second closure sections are disposed at opposite sides of the central section. The torso portion, first closure section, and second closure section configured to permit the garment be secured to the animal's torso when the central section is positioned under the animal's torso and first and second closure sections are overlapped and in contact with each other on a back part of the animal, a fit of the garment being adjustable by varying a degree of the overlap.

The central portion may include a first non-woven fabric, at least one of the first and second closure sections may include a second non-woven fabric different from the first fabric, and wherein the first and second non-woven fabrics are selected from materials that can withstand at least one of steam and ethylene oxide sterilization. The first non-woven fabric may include a SMS fabric, and the second non-woven fabric may include nonwoven cohesive cotton portions. The first and second closure sections may include the second non-woven fabric and having self-adhering portions operative to secure the first and second closure sections to each other when they are overlapped and the respective self-adhering portions in contact with each other. At least one of the first and second closure sections may include an adhesive disposed thereon operative to secure the first and second closure sections to each other when they are overlapped and in contact with each other in a region of the adhesive.

Edge regions of the neck and leg openings may include a plurality of notches formed therein, to thereby accommodate animals of different sizes. A lower back end of the torso portion may include at least one of indicia and perforations to delineate a respective removable portion to allow for the garment to be easily adjusted in size.

The central section may include a plurality of connected panels together and adjacent panels may be connected using a flat-lock construction seam. The garment may further include a first leg portion connected to one of the pair of front and/or rear leg portions connected to respective leg openings. The first and second leg portions may include a nonwoven cohesive cotton having a closure position to secure a respective leg portion and provide a better fit. The leg portions may also include cut-away portions, such as defined by lines or perforations, to allow length to be easily adjusted by a user.

The garment may further include a first leg portion connected to one of the pair of front leg openings and a second leg portion connected to the other of the pair of front leg openings. The first and second leg portions may include nonwoven cohesive cotton, each leg portion being configured to be wrapped around a respective leg and having a respective self-adhesive portion to secure the respective leg portion in a wrapped position.

In a further embodiment, a protective garment for an animal includes a torso portion having a bottom, a first side and a second side, and a torso closure, the first and second sides having respective first and second upper edges and being configured to wrap around respective sides of an animal's torso in an overlapping manner when the garment is placed on the animal with the bottom of the torso portion adjacent a belly of the animal, the torso closure including a first closure at the first upper edge, the first closure being configured to secure the first and second sides to each other along the first upper edge when the first and second sides are overlapping. An elongated groin strip extends rearwardly from a rear of the torso portion bottom and has an end portion with a closure. The groin strip has a length sufficient to wrap around a rear end of the animal and be secured with the closure to the back of the animal along the animal's back and a point forward of a tail of the animal. A transition portion between the rear of the torso portion has an opening positioned and sized to permit the animal's tail to pass therethrough and to expose the animal's anus, wherein the animal can freely defecate while the garment is worn. The bottom of the torso can have a further opening, such as formed by overlapping but unjoined fabric parts, to allow a male dog to urinate through the opening. Perforation or cut lines can be provided instead to allow an opening to be made and positioned as needed depending on the sex and size of the animal. The garment can be formed primarily of a non-woven elastic fabric having an elasticity of between about 0.5% to about 15%.

BRIEF DESCRIPTION OF THE DRAWINGS

The above and other features of the present invention will become more apparent by describing in detail exemplary embodiments thereof in conjunction with the accompanying drawings, in which:

FIG. 2 is an underside view illustrating an overlapping sleeve construction of the garment of FIG. 1 before fitting to the pet, according to an exemplary embodiment of the present invention;

FIG. 3 is an underside view illustrating the overlapping sleeve construction of the garment of FIG. 1 after fitting to the pet, according to an exemplary embodiment of the present invention;

DETAILED DESCRIPTION OF THE EMBODIMENTS

Figure 1:
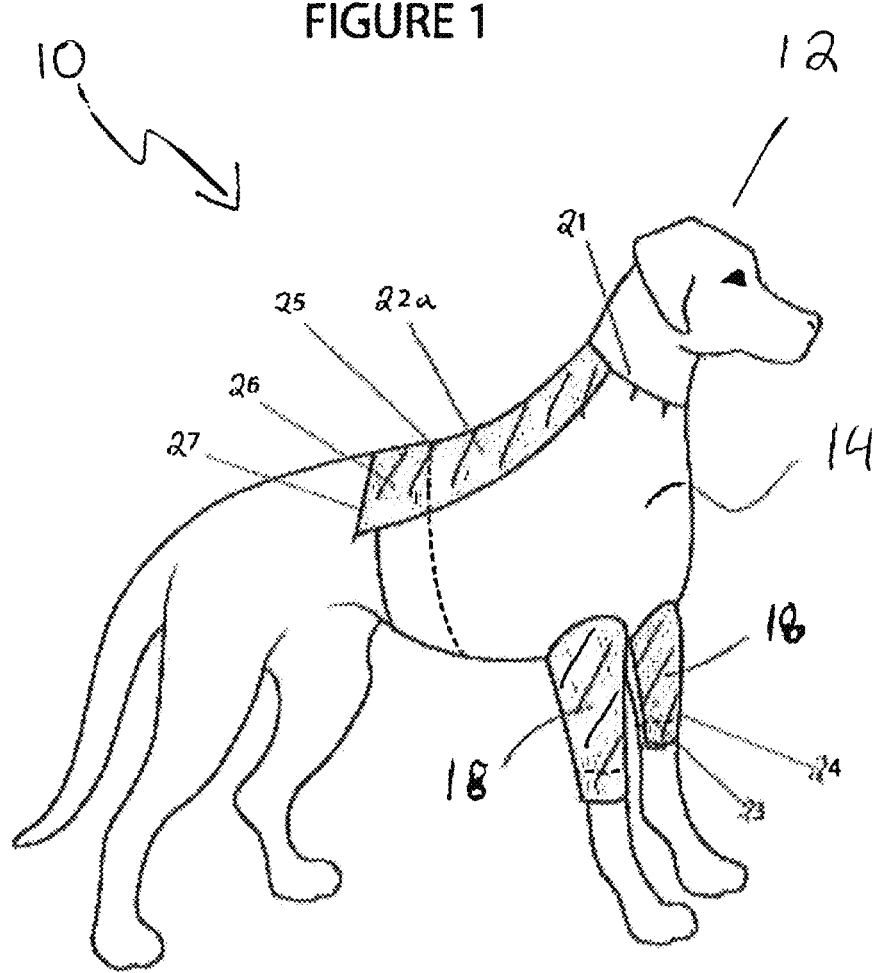
FIG. 1 is a perspective view illustrating a garment according to an exemplary embodiment of the present invention and being worn by a pet.
Figure 4:
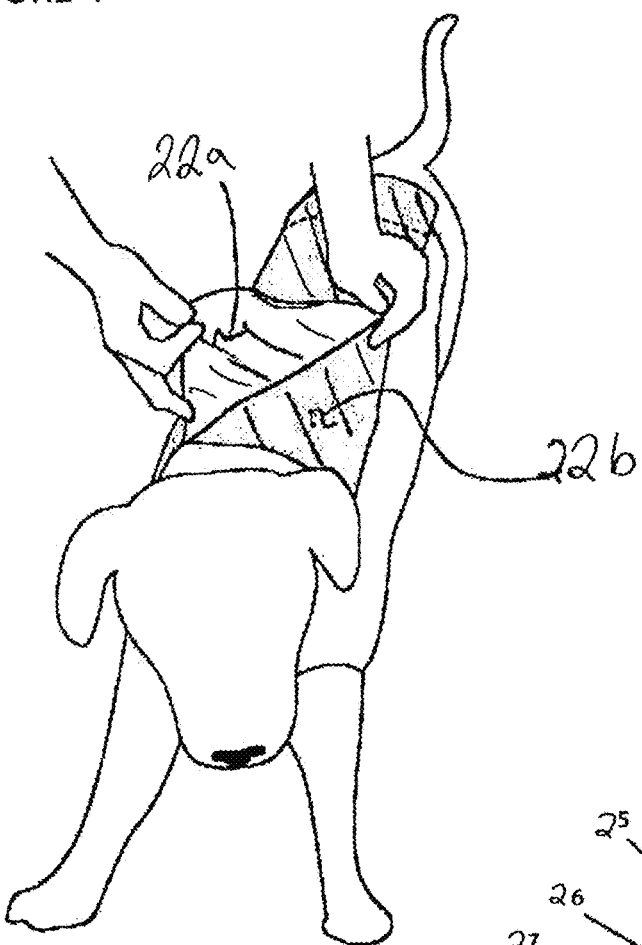
FIG. 4 is a top view illustrating an overlapping back panel of the garment of FIG. 1 and a method of fitting the torso portion of the garment to the pet, according to exemplary embodiments of the present invention.

Exemplary embodiments of the present invention will be described more fully hereinafter with reference to the accompanying drawings. The present invention may, however, be embodied in different forms and should not be construed as limited to the embodiments set forth herein. Like reference numerals may refer to like elements throughout the specification. The sizes or proportions of the elements illustrated in the drawings may be exaggerated for clarity.

Turning to FIGS. 1-3 and 6, there is shown a step-in garment 10 for animals and which can be used post-Conditions to prevent the animal from directly licking or chewing at the Conditions. In this embodiment, the garment is configured to cover at least most of the trunk, neck, and front legs of the animal.

In an embodiment, the garment is primarily made of two fabric types: (a) a polypropylene non-woven fabric that is waterproof and breathable, and (b) cohesive nonwoven cotton panels. In a more particular embodiment, the polypropylene fabric is Spunbond Meltblown Spunbond (SMS) fabric. SMS fabric allows airflow but is substantially impermeable to dust and dirt and can be configured with a soft, silky texture and also has anti-static and anti-bacterial properties. In a particular configuration, a medium thickness SMS fabric is used. In the illustrated configuration, the polypropylene fabric is used for the lower and side (flank) sections of the torso portion of the garment 10 while the closure portion of the torso section and the arm and leg sleeves are formed from the nonwoven cotton panels and sleeves. The cotton portions help give the garment more flexibility and thus increases comfort for the pet.

Advantageously, the fabric materials used can be effectively sterilized using common techniques, such as steam and ethylene oxide, without compromising the integrity of the garment. In an embodiment, the exterior surface of either fabric can also have also printing in a variety of colors and patterns to provide a more decorative look to the garment and for other reasons.

One or both of the fabrics used can be at least slightly elastic to provide a snug fit while accommodating normal movement and breathing motions of the animal. A snug fit can also result in less rubbing and allow the garment to be applied tightly enough to provide a compression effect. In particular embodiments the SMS-like material has an elasticity of about 3%. In a particular embodiment, the polypropylene fabric and/or the cotton fabric have an elasticity of at least 3% and more particularly between 3% and 20% and most particularly between 5% and 10%.

Turning to FIGS. 1-4, there is shown a garment 10 being worn by a pet 12. Although a dog is illustrated, the garment 10 is also suitable for other pets, such as cats and similar animals. While the invention is discussed in the context of pets, it may also be suitable for other animals that would benefit from protective body covering garments as disclosed herein. The garment 10 has a torso portion 14 and leg portions 18 (alternatively referred to herein as sleeves 18). The garment 10 can be provided in a partially assembled state that allows the pet 12 to easily step into the garment 10. The garment 10 can then be fitted to the pet 12 by means of overlapping sections that are then secured in place and, in one configuration, are self-securing.

The non-woven material used in garment 10 will not unravel due to its nonwoven construction. Accordingly, a raw finish can be provided on exterior edges, simplifying the construction and reducing the manufacturing costs. In an embodiment, the fabric of the garment 10 is of a type that can be easily cut by a user or torn along a perforation to thereby also allow a consumer to easily adjust the size of the garment 10, to the body of the pet 12 for optimum fit. It is understood that when such consumer alterations involve cutting, the cut edges of the garment 10 may be left raw because the fabric of the garment 10 will not unravel. Thus, further adjustment can be made by removing parts of the garment 10 to make the torso portion 14 or the sleeves 18 shorter by cutting and/or (if suitably perforated) tearing their respective end portions.

Figure 6:
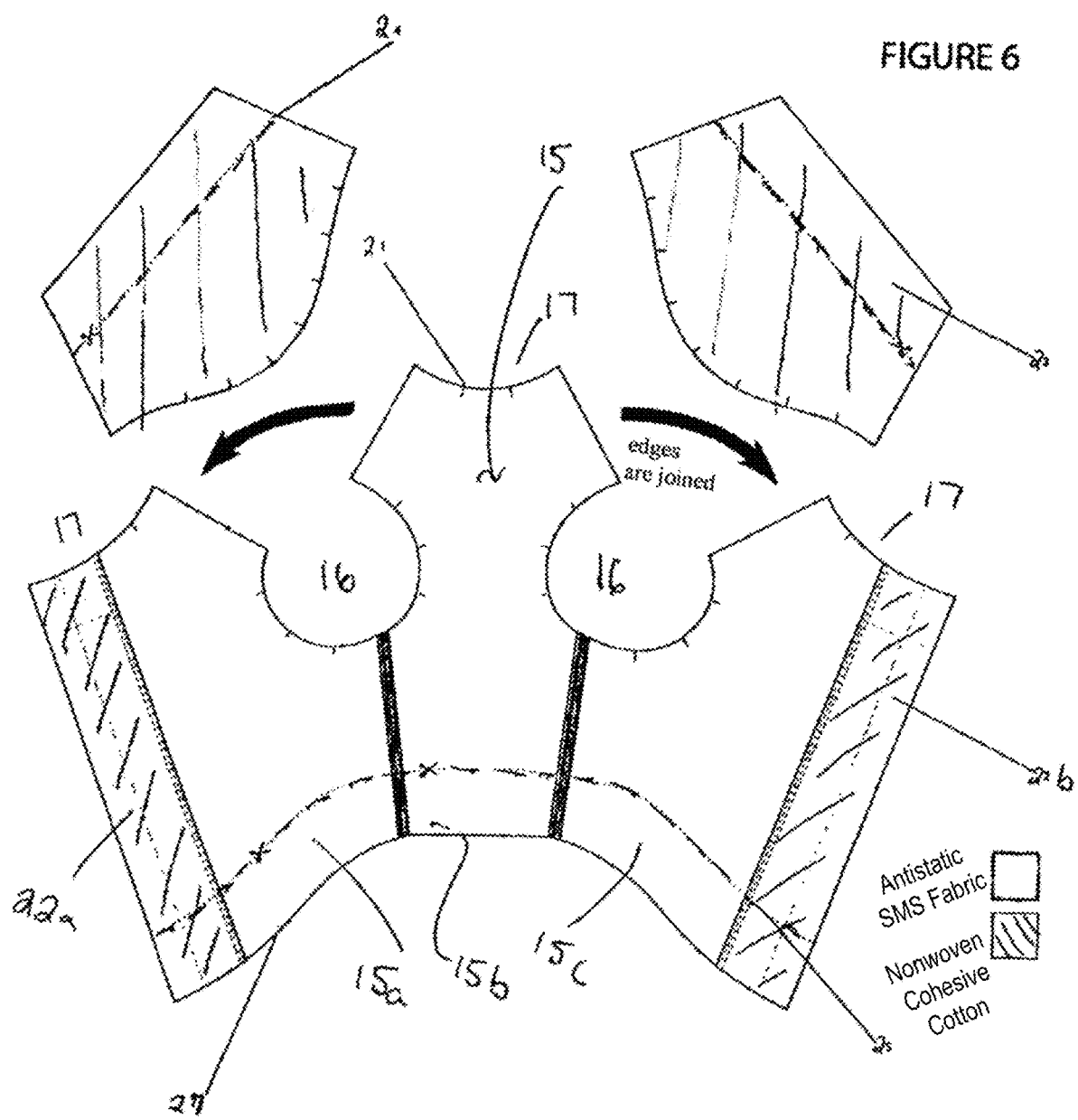
FIG. 6 is an exploded view illustrating the various fabric panels of an exemplary embodiment of a garment according to aspects of the present invention.

In a particular embodiment, the torso portion 14 is formed of an SMS fabric body 15 (also referred to as a central section 15) and can be a single sheet or made of multiple panels seamed together as shown in FIG. 6. In one embodiment, the multiple panels comprise a left flank panel 15a, a lower panel 15b, and a right flank panel 15c. The seams can be formed with a flat-lock construction to increase comfort. The torso portion 14 has edge regions 16 which define openings through which the pet's 12 legs will pass and an edge region 17 through which the pet's 12 neck will pass (when the garment is fully assembled). The torso portion 14 has torso closure sections 22a and 22b which include a nonwoven cohesive cotton fabric. The garment 10 is sized so that when it is placed on a pet (e.g., the pet 12), it can be wrapped around the pet's torso so that the closure sections 22a and 22b overlap at least partially, forming an overlap portion 26, to allow for adjustment in view of different animal body circumferences.

In an embodiment, the material used for the torso closure sections 22a and 22b (as well as other closure portions discussed herein) is self-adhering so that the material will stick to itself in the overlapping portion 26 but not the pet 12. Various self-adhering options for the materials used in the garment are known to those of ordinary skill in the art. The torso portion 14 can be closed around the pet by simply pressing the closure sections 22a and 22b together. Alternatively, a hook-and-loop closure can be used or an adhesive section with a peel-off covering can be provided. In a particular embodiment, such adhesive would be positioned only on the closure sections 22a, 22b so that the adhesive does not stick to the pet 12 when the garment is being worn.

The overlapping adhesive or self-adhering torso closure sections 22a and 22b allow the garment 10 to fit a range of pet sizes, minimizing the number of sizes required to keep in inventory by a merchant or veterinarian. It also allows the garment 10 to be fitted with a loose fit or a compression fit depending on preference and breed of the pet 12.

The sleeves 18 include leg panels 23 which are attached as shown to the torso portion 14. The leg panels 23 can be formed of the self-adhesive nonwoven cohesive cotton materials and configured so they can be easily wrapped around the pet's 12 legs (and to adhere at the overlap resulting from the wrap) so as to fit the garment 10 to the pet 12, to keep the sleeves 18 secure from sliding, and to adjust for different leg circumference.

To accommodate animals with different neck sizes, a plurality of notches 21 can be formed in the neck region 17. Preferably, the notches 21 are ⅜" cuts, but the ⅜" inch dimension is non-limiting. The cuts may be all the way through or perforated and partially or fully opened as needed. Similar notches can be formed in the edge regions 16 and the leg panels 23, as shown in FIG. 6, to accommodate pets 12 with different front leg sizes. The notches may be a single cut or formed from two cuts to create a preformed V-shape. As described above, when non-woven fabrics that will not unravel or easily tear are used in the garment 10, the garment 10 can also be provided with a raw edge finish 27 simplifying construction.

Various cut-away portions can be indicated on the sleeves 18 and torso portion 14, respectively, of the garment 10 indicating different lengths of sleeves 18 and the torso portion 14, respectively, to allow for adjustment of animals with different leg and body lengths. Preferably, the cut-away portions are indicated by one or more dotted lines 24 and 25 showing where a user should cut the fabric. Alternatively, or in addition, the dotted lines 24 and 25 may be series of perforations such that the garment 10 can be torn at the lines 24 and 25 along the dotted lines 24 and 25 without the use of cutting tools.

As shown in FIGS. 1-4 and 6, the dotted lines 24 and 25 may be set at predetermined locations of the leg panels 23 and body 15, respectively, as guides for cutting end sections of the leg panels 23 and body 15 based on the protective body coverage needed in light of the location of the Conditions, the kind, size, age, body shape, etc., of the pet 12, and for comfort. In addition, multiple sets of dotted lines 24 can be provided in each of the leg panels 23 and/or multiple sets of dotted lines 25 can be provided in the body 15 to increase the level of adjustability of the garment 10. As noted, because the fabrics used in the garment 10 are non-woven, they can be cut with scissors or torn at the dotted lines 24 and 25 (when the doted lines 24 and 25 include perforations) without unraveling.

In an embodiment, the sleeves 18 are pre-attached to the garment. The sleeves 18 can be configured to be removed by a user, such as by cutting or tearing along a designated line or set of perforations. In an alternative embodiment, the sleeves 18 can be provided in an unattached form which a user can optionally connect to the torso portion. For example, a sleeve 18 can be fitted inside a respective leg hole and a top portion of the sleeve 18 folded down over edge regions 16. An adhesive strip or other mechanism can be used to secure the two pieces together.

Although the illustrated garment 10 extends only partially down the torso, various embodiment can be provided that extend further down the torso to allow for protection of wounds or other Conditions on the lower part of the pet 12. In such embodiments, the garment 10 can extends far enough down the torso so that the pet 12 cannot get its back paw under the edge 27. Thus, for example, several cut-away portion-designating dotted lines 25 can be provided at different positions along the torso portion 14 to allow the garment 10 to be easily modified to fit the torso of the specific pet 12 at issue. Similarly, and as recited above, several cut-away portion-designating dotted lines 24 can be provided at different positions along each leg portion 18 to allow the garment 10 to be easily modified to adjust for the leg size of the specific pet 12.

Figure 5:
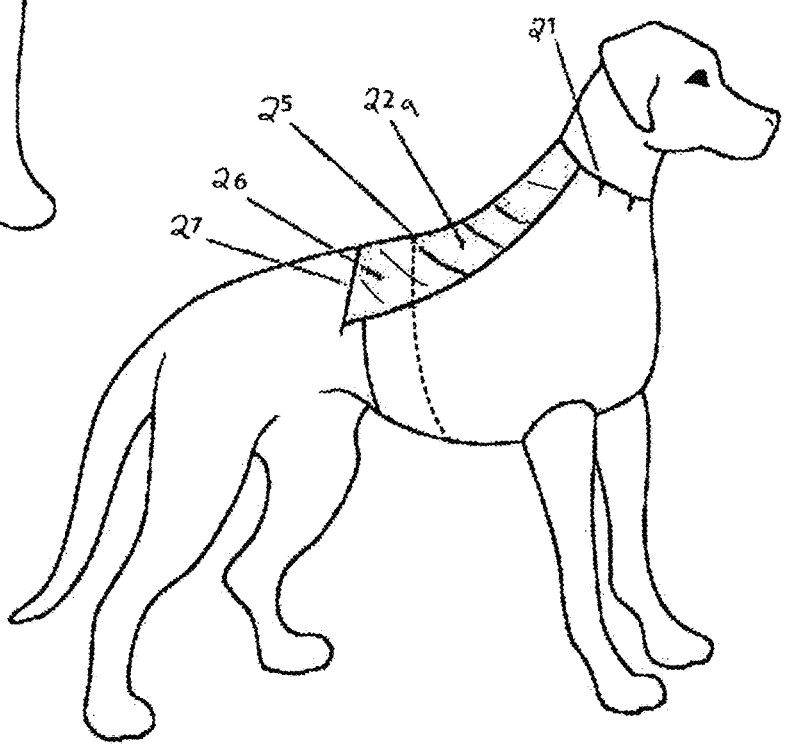
FIGS. 5A and 5B are perspective views of a torso configuration of a garment, according to an exemplary embodiment of the present invention.
Figure 5B:
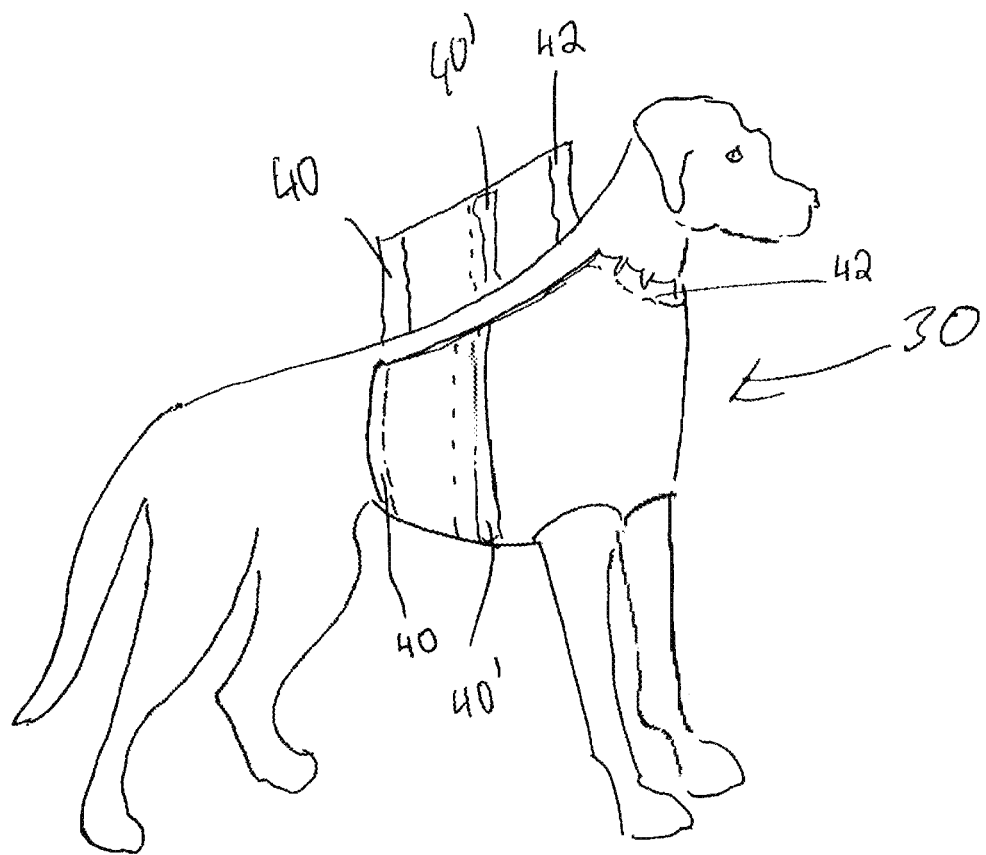

FIGS. 5A and 5B show a perspective view illustrating a torso-only configuration of a Conditions garment 30, according to an exemplary embodiment of the present invention. The garment 30 may be worn by the pet 12 post-surgery to promote a quick healing of the Conditions. The garment 30 is structurally similar to the garment 10 but without the sleeves 18. Notches 21 can be provided in the torso portion 14 along the edge regions 16 to allow for more flexible fitting.

To help keep the garment 30 in place, an elastic tape or strip 40 can be applied to the garment 30 inside surface at the base of the jacket around the torso. A similar tape or strip 42 can be provided in the neck region. The tape is preferably a paper-based elastic tape with enough stretch to help hold the garment 30 in place and prevent it from rolling up along the edges without applying any significant compression. The exposed surface of the tape along the inside surface of the garment 30 can also be configured or treated so that the surface has some friction against the pet's 12 fur or skin to further help hold the garment 30 in place and keep it from slipping. In the torso region 14, additional strips 40' can be provided adjacent the one or more designated cut-away dotted lines 25 so that such a strip will remain near the end of the torso region 14 even if some parts of the garment 30 are removed.

Figure 8:
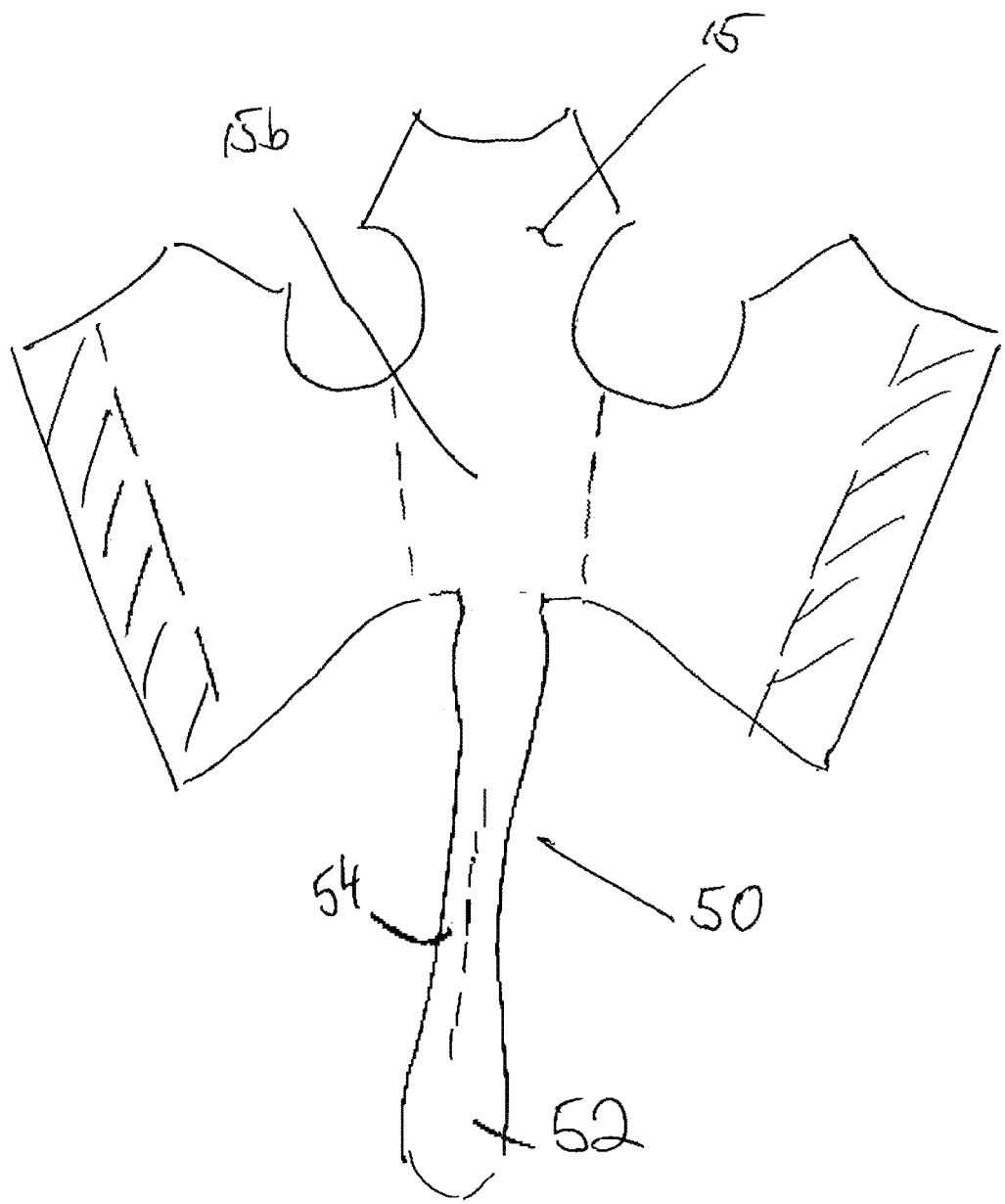
FIG. 8 is an illustration of a torso configuration of a garment, according to an exemplary embodiment of the present invention and having a groin strip feature.

Additional variations of the garment can also be provided. For example, and as shown in FIG. 8, the bottom (belly) portion of the torso region 14 can be provided with a groin strip 50 extending rearward (e.g., towards the back of the animal when the garment is worn) therefrom. The strip 50 can be passed between the back legs of the pet, over the groin area, and wrap around, attaching along the back of the garment using a self-adhering or other adhesive feature such as that used in the closure sections 22a/22b of the torso region. The strip 50 can have a length sufficient for an end portion 52 to reach the closure sections. For example, end portion 52 may have an adhesive or self-adhesive portion compatible with the material used for the closure sections 22a/22b. The groin strip 50 can have a split, perforated or otherwise separable (such as by cutting along a guide line) area along at least part of its length 54 to accommodate the pet's tail. The strip 50 can be integrally formed with the torso portion. Alternatively, it can be a separate piece that a user can attach to the end of the torso region 14 in the belly area. For example, the groin strip can have an adhesive area at its end that can be used to connect it to the inside surface of the torso region 14 at the bottom. Guide lines or other indicia can be printed on the garment to help the user position the strip.

In an embodiment, a full rear garment part can be provided to cover the pet's groin, legs, and lower back. The rear garment part can be configured and structured in a manner similar to that of the garments 10 and 30 as discussed above with sleeves or bloomers to fit over the back legs and a torso portion that wraps around the pet's torso. As will be appreciated, a neck region would not be needed. However, an analogous opening for the tail can be provided. Alternatively, or in addition, a groin strip or other piece can also be provided. The rear garment part can include an adhesive strip, self-adhesive material, or other connection mechanism running along the outer part of the torso portion opposite the legs and which will engage the main garment part (e.g., the garment 10) to then form a complete garment that is fitted to the pet 12.

Figure 9:
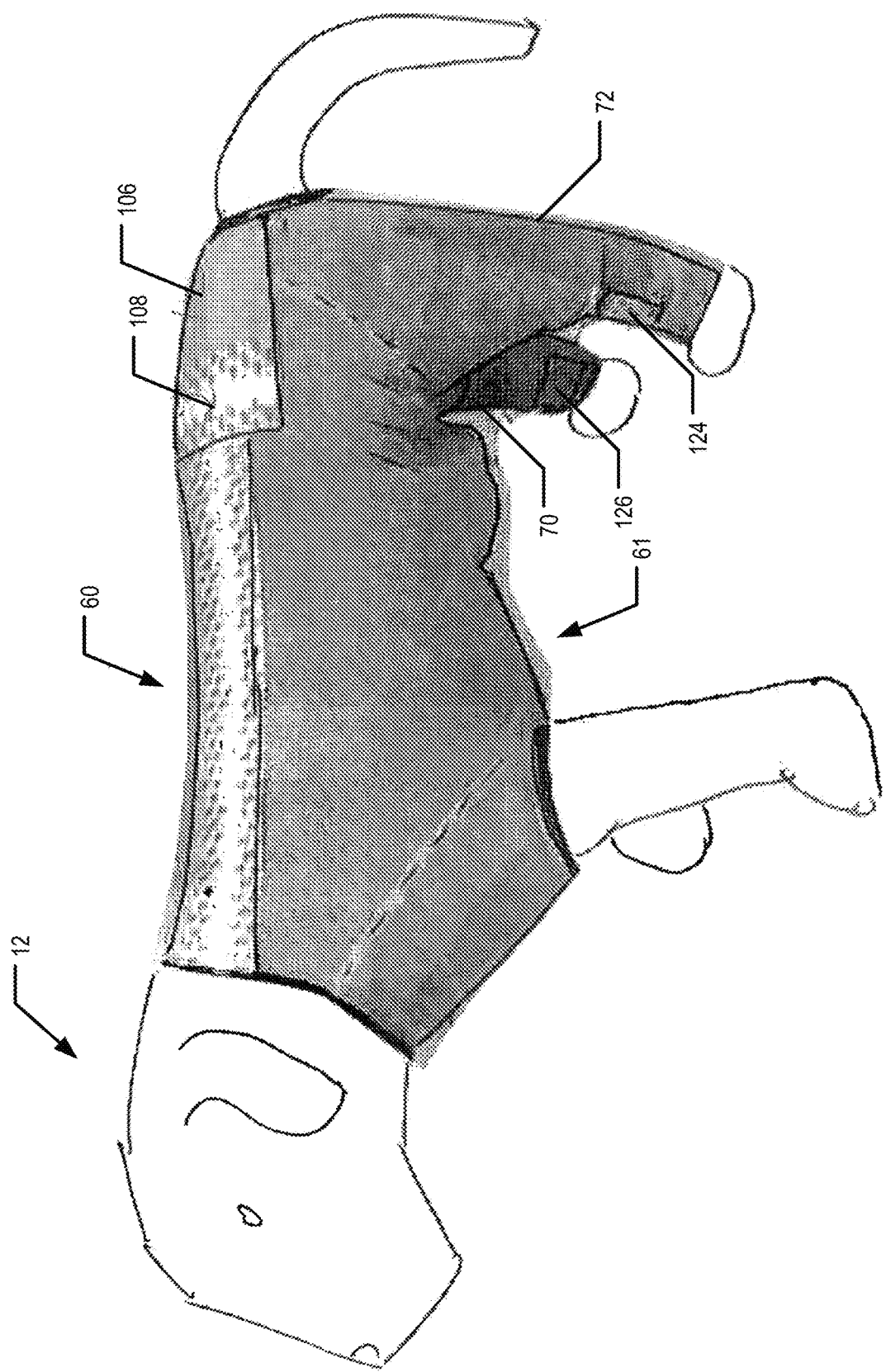
FIG. 9 is a side view illustrating a garment according to an exemplary embodiment of the present invention and being worn by a pet.
Figure 10:
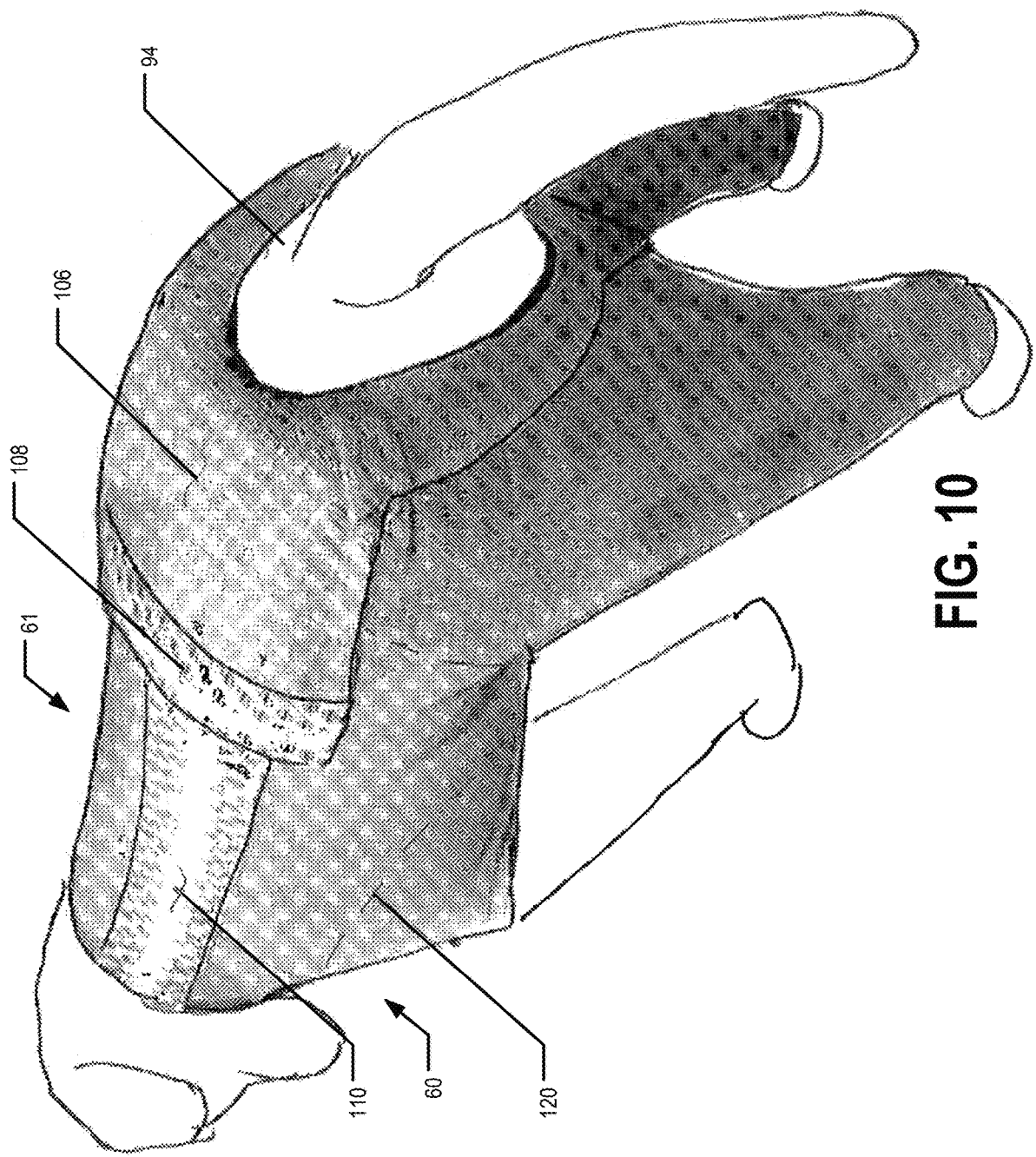
FIG. 10 is perspective view illustrating a rear end of the garment of FIG. 9 being worn by the pet, according to an exemplary embodiment of the present invention.
Figure 11:
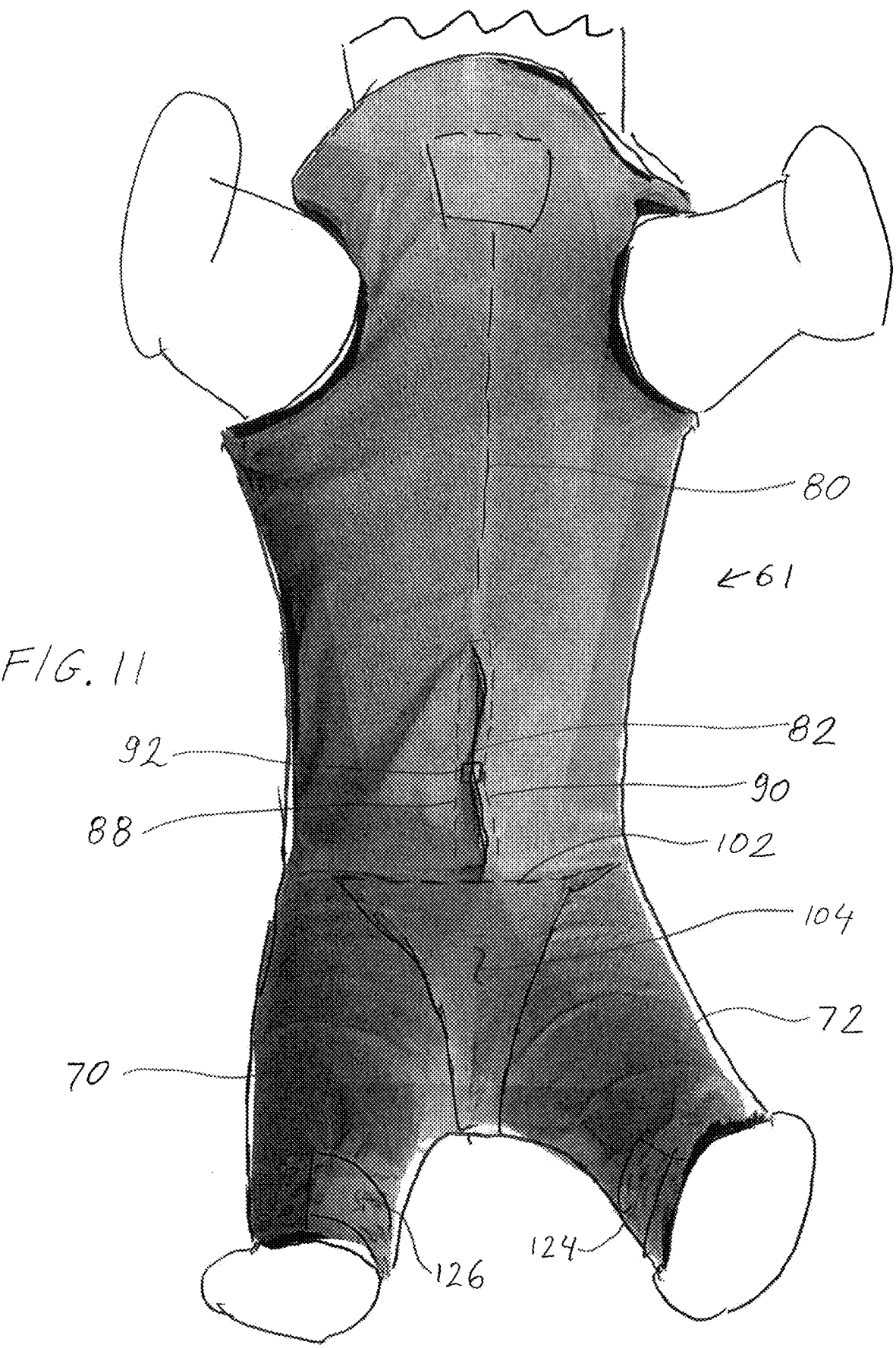
FIG. 11 is an underside view illustrating the garment of FIG. 9 being worn by the pet, according to an exemplary embodiment of the present invention.
Figure 12:
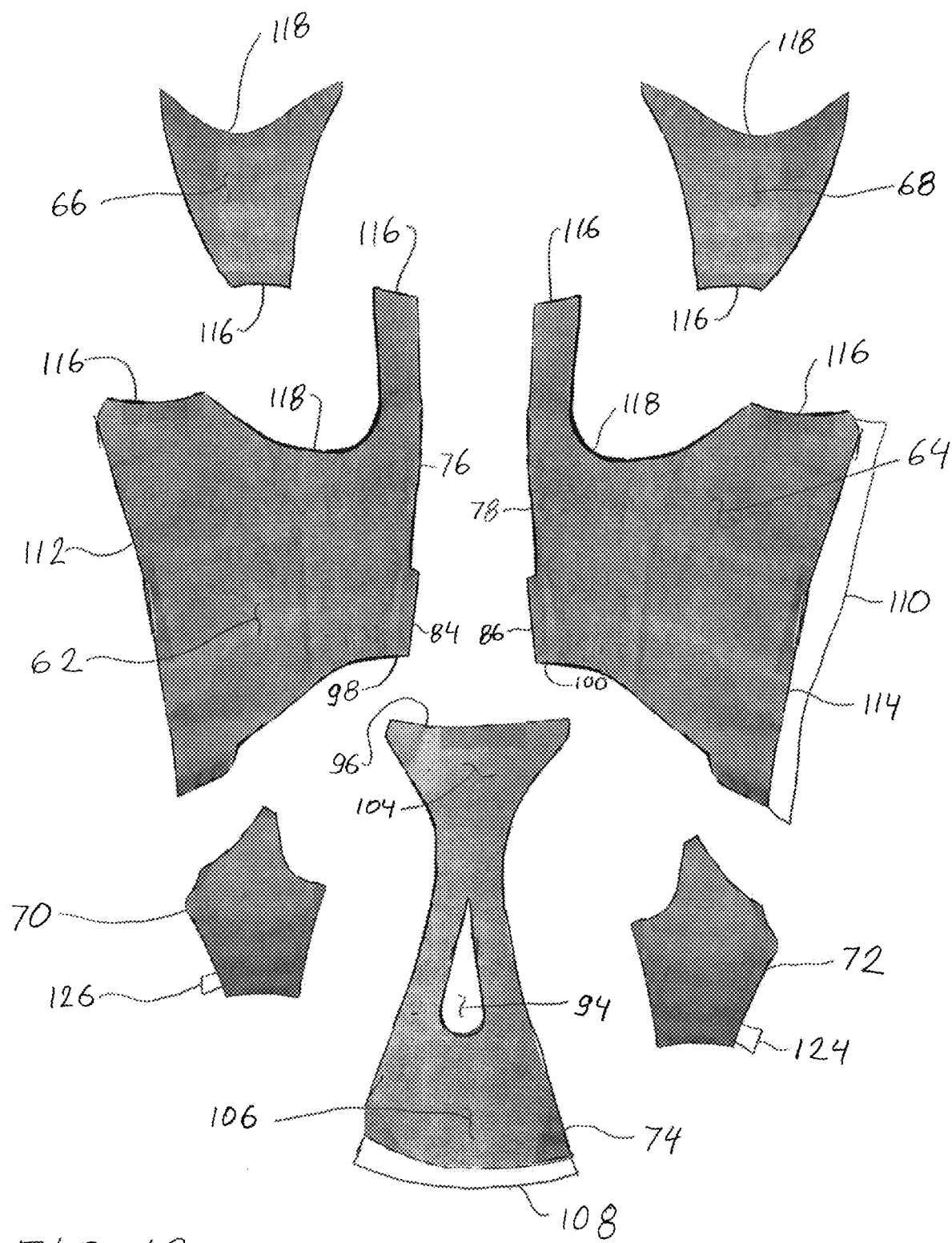
FIG. 12 is an exploded view illustrating the various fabric panels of an exemplary embodiment of a garment according to aspects of the present invention.

FIGS. 9-11 illustrate a garment 60 being worn by the pet 12 according to various exemplary embodiments. The material of the garment can be provided in several different components which are joined together. FIG. 12 illustrates one configuration of individual components, laid out flat according to an exemplary embodiment, and that can be assembled to form the garment 60. In alternative embodiments, the various components can be formed as a single piece instead of two or more pieces that are then joined together.

Referring to FIG. 12, the garment 60 may include a left body panel 62, a right body panel 64, a left shoulder panel 66, a right shoulder panel 68, a left leg sleeve panel 70, a right leg sleeve panel 72 and a groin strip 74. The left and right body panels 62 and 64 and the left and right shoulder panels 66 and 68 form a torso portion 61 of the garment 60.

The left and right body panels 62 and 64 may be shaped to fit a particular pet's body based on the physical characteristics of the pet. The left and right body panels 62 and 64 may be contoured according to the pet's 12 body to provide a snug fit and promote fast healing of the Conditions, but to also accommodate normal movement and breathing motions.

An edge 76 of the left body panel 62 and an edge 78 of the right body panel 64 may be joined with a seam 80, as shown in FIG. 11, to attach the left and right body panels 62 and 64 to each other.

In an embodiment, at least a portion 82 of the underside of the garment 60, adjacent to the seam 80, is not seamed to provide an opening, as shown in FIG. 11, to account for a male pet 12 urinating needs. For example, an edge 84 of the left body panel 62 and an edge 86 of the right body panel 64, corresponding to the portion 82 of the garment's 60 underside can be left unsewn. These edges can be formed to overlap so that the opening does not gape. Alternatively, a perforated section or cut line can be provided wherein a user would create the opening when the garment is to be used with a male animal. For example, perforations, may be included at areas 88 and 90 on the left and right body panels 62 and 64, respectively, as aids for removing predetermined sections of the garment 60. However, the dotted lines 88 and 90 are optional, and may be omitted in some embodiments. In addition and/or alternatively, a closure section 92 may be included, such as on the left and/or right body panels 62 and 64, adjacent to the portion 82 for keeping the portion 82 closed. The closed portion 82 may provide increased protection to the pet's 12 body. In addition, the closure section 92 may be used to adjust the looseness/tightness of the fit at the lower back portion of the pet 12. However, it is understood that a female pet 12 can wear the garment 60 with an unsewn/not joined portion 82 without affecting the healing properties of the garment 60. If the pet's 12 Conditions are located at an area corresponding to the portion 82, the closure section 92 may also be used to close the portion 82.

It is understood that the edges 76, 78, 84 and 86 may have varying lengths to adjust the size of the portion 82 as needed based on the size, type, breed, etc., of the pet 12.

Referring to FIGS. 9-10 and 12, to put the garment on, the animal steps into the torso portion and into the leg holes/sleeves. The left and right body panels 62 and 64 may be wrapped around the pet's 12 torso and overlap over the animal's back. Closures on the edge 112 and/or 114 can be used to secure the garment in a closed position. Various closures, such as disclosed above, can be used. In one configuration, back closure 110 may be attached to, for example, an edge 114 of the right body panel 64, as shown in FIG. 12. In this case, the back closure 110 may be configured to be selectively attached (e.g., closed) to the left body panel 62 over the pet's 12 back, adjacent to an edge 112 of the left body panel 62.

The left and right body panels 62 and 64 may be wrapped around the pet's 12 torso to a desired level of snugness, and then the back closure 110 may be pressed against an edge 112 of the left body panel 62 at the pet's 12 back to close the left and right body panels 62 and 64 over the pet's 12 back.

Alternatively, or in addition, the back closure 110 may be attached to the left body panel 62 at the edge 112, and may close the left and right body panels 62 and 64 by being pressed on a surface of the right body panel 64 adjacent to the edge 114 over the pet's 12 back.

Referring to FIG. 11, groin strip 74 that will pass through the animal's legs as shown in FIGS. 11 and 12, wrap around the pet's groin and onto the pet's 12 back. An opening is provided of sufficient size to allow a tail to pass through and also expose the pet's 12 anus and the urethral orifice (for female animals) so the animal can defecate and urinate without having to remove or open parts of the garment.

In one an embodiment, groin strip 74 has an hourglass-like shape with tapering portion 104 and an end portion 106 configured to be selectively attached to the pet's 12 back through a closure 108. Groin strip 74 has a transition portion including a tail hole 94 between the tapering portion 104 and the portion 106. The tail hole 94 can be tear-drop shaped, as illustrated. Depending on the anatomy of the animal, other shapes may be more appropriate, such as round, oval, or triangular. Perforations and/or cut lines can be provided to allow a user to more easily vary the size of the opening to accommodate any particular animal. It is understood that the tear-drop shape of the tail hole 94 illustrated in FIG. 12 is merely exemplary, and the size and shape of the tail hole 76 may be set to accommodate a range of pet sizes and/or breeds, in addition to the pet's sex.

Referring to FIGS. 11 and 12, the groin strip 74 may be attached to or extend from the rear bottom portion of the torso. For example, an edge 96 of the groin strip 74, an edge 98 of the left body panel 62 and an edge 100 of the right body panel 64 may be joined with a seam 100, as shown in FIGS. 11 and 12.

The portion 106 may be selectively attached to the first and second body panels 62 and 64 as shown in FIGS. 9 and 10. For example, the closure 108 may be pressed onto the left body panel 62, the right body panel 64 and/or the back closure 110 to close the groin strip 74 over the pet's 12 back at a desired level of snugness. The portion 106 may have a generally rectangular shape and may have a width approximately in size to the width of the pet's 12 back. However, the present invention is not limited to such shape.

The left body panel 62 may have an edge 118 disposed between a pair of edges 112. The right body panel 64 may also have an edge 118 disposed between two edges 116, as shown in FIG. 12. The left shoulder panel 66 may have an edge 116 and an edge 118. In addition, the right shoulder panel 68 may have an edge 116 and an edge 118, as shown in FIG. 12.

The edges 118 of the left body panel 62 and left shoulder panel 66 may be joined with a seam 120, as shown in FIG. 10. The edges 118 of the right body panel 64 and right shoulder panel 68 may also be joined with a seam. The edges 116 of the left body panel 62, right body panel 64, left shoulder panel 66 and right shoulder panel 69 form the neck opening.

In an embodiment, the garment 60 includes the left and right leg sleeves 70 and 72 attached to the torso portion 61 as shown in FIGS. 9-11. The left and right leg sleeves 70 and 72 are configured to be easily wrapped around the pet's 12 legs. Once that the left and right leg sleeves 70 and 72 are wrapped around their respective legs at a desired level of snugness, the closures 124 and 126 are simply pressed on the surface of the left and right leg sleeves 70 and 72, respectively, to maintain the left and right leg sleeves 70 wrapped. The length of the sleeves can be adjustable as discussed above.

In an embodiment, the garment 60 also includes front leg sleeves attached to the torso portion 61 and the left and right shoulder panels 66 and 68. The front leg sleeves may be attached to the torso portion 61 by seams, and may be wrapped around the animal's front legs and held in places by closures similarly to the left and right leg sleeves panels 70 and 72 described above. The length of the sleeves can be adjustable as discussed above In an embodiment, the torso portion 61, the groin strip 74, the left and right shoulder panels 66 and 68, the left and right leg sleeve panels 70 and 72 and the front leg sleeves include an elastic nonwoven fabric material with an elasticity of about 0.5% to about 15%, more specifically about 5% to 10% and most specifically 7%. This fabric may include a plurality of layers stacked on each other, and may include, for example, cellulose and polypropylene (PP) layers with elastic threads. In an embodiment, the fabric is a layered fabric with a water-repelling outer layer of non-woven polypropylene and an inner layer of an absorbent material, such as cellulose. A particularly suitable fabric is MICROFIN DRY™, available from Haso USA, Inc.

In an embodiment, the back closure(s) 110 and the closures 108, 124 and 126 have a first portion pre-attached to the garment 60, as shown in FIG. 12, and a second portion (e.g., the closure portion) configured to be selectively attached to the garment as described above.

The back closure(s) 110 and the closures 108, 124 and 126 may be self-sealable elastic diaper tape closure systems. The back closure(s) 110 and the closures 108, 124 and 126 may include a nonwoven fabric sealing tape and hook elements and which may be configured to form a Y-bond between the fastening and release tape. Thus, the back closure(s) 110 and the closures 108, 124 and 126 may be stretchable for added comfort to the pet 12. One suitable closure is a WAVE C closure material available from Avery Dennison. As noted, other closure means, such as adhesive or self-adhesive components can be used. For example, closure portion of the back closure(s) 110 and the closures 108, 124 and 126 includes an adhesive section with a peel-off covering (e.g., a glue strip).

Figure 7:
FIG. 7 is an illustration of a method for packaging a garment as disclosed herein.

The Conditions-covering garments for pets disclosed herein are easy to apply, resists biting and scratching by a pet and can be used to protect Conditions on the animal's torso and, optionally legs. (These wounds may have a separate bandage applied to them and which is underneath the garment.) The garments disclosed herein are more visually appealing than pet cones. The visual appeal is further enhanced by the snug fit of the bandage and visual appeal can be further improved by printing decorative patterns and messages on the garment. The garment can be manufactured cheaply enough for it be provided in a disposable single-use form provided to consumers in individual packs that are easy to store, transport, and use. For example, a single pre-sterilized garment can provided be folded and packaged in a sealed plastic and/or metallized tear-open pouch. An example is shown in FIG. 7.

Various aspects of the invention have been disclosed and described herein. However, various modifications, additions and alterations may be made by one skilled in the art without departing from the spirit and scope of the invention as defined in the appended claims.

What is claimed is:

1. A protective garment for an animal, the garment comprising:
a torso portion having a bottom, a first side and a second side, and a torso closure, the first and second sides having respective first and second upper edges and being configured to wrap around respective sides of an animal's torso in an overlapping manner when the garment is placed on the animal with the bottom of the torso portion adjacent a belly of the animal, the torso closure comprising a first closure at the first upper edge, the first closure being configured to secure the first and second sides to each other along the first upper edge when the first and second sides are overlapping; and
an elongated groin strip extending rearwardly from a rear of the torso portion bottom, having an end portion and a length sufficient for the groin strip to wrap around a rear end of the animal and overlap at the end portion at least one of the first and second sides when the garment is on the animal, the end portion including a groin closure configured to secure the elongated groin strip to the torso portion at the overlap between the groin closure and at least one of the first and second sides at a point forward of a tail of the animal;
the groin strip having a transition portion between the rear of the torso portion and the end portion of the groin strip, the transition portion having an opening therein positioned and sized to permit the animal's tail to pass therethrough and to expose the animal's anus, wherein the animal can freely defecate while the garment is worn,
wherein at least one of the torso portion and elongated groin strip includes an elastic nonwoven fabric.

2. The protective garment of claim 1, wherein the opening of the transition portion is one of circular, oval, and teardrop shaped, and triangular.

3. The protective garment of claim 1, wherein the opening of the transition portion is further configured to expose a urethral orifice of a female animal, wherein the female animal can freely urinate while the garment is worn.

4. The protective garment of claim 1, the bottom of the torso portion having a bottom opening therein positioned to permit a male animal to freely urinate while the garment is worn.

5. The protective garment of claim 4, wherein the bottom opening comprises overlapping portions of the garment.

6. The protective garment of claim 4, further comprising a lower belly closure configured to close the bottom opening in the torso portion.

7. The protective garment of claim 1, wherein the bottom of the torso portion includes at least one of indicia and perforations where a bottom opening can be formed, the bottom opening positioned to permit a male animal to freely urinate while the garment is worn.

8. The protective garment of claim 1, wherein the transition portion is tapered and the elongated groin strip has an hourglass shape.

9. The protective garment of claim 1, further comprising a first leg sleeve and a second leg sleeve attached to the torso portion, and each of the first and second leg sleeves is configured to be wrapped around the animal's respective rear legs.

10. The protective garment of claim 9, wherein the first leg sleeve includes a first leg closure and the second leg sleeve includes a second leg closure, and the first and second leg closures are respectively configured to maintain the first and second leg sleeves wrapped at a desired level of snugness.

11. The protective garment of claim 1, further comprising a first leg sleeve and a second leg sleeve attached to the torso portion, and each of the first and second leg sleeves is configured to be wrapped around the animal's respective front legs.

12. The protective garment of claim 11, wherein the first leg sleeve includes a first leg closure and the second leg sleeve includes a second leg closure, and the first and second leg closures are respectively configured to maintain the first and second leg sleeves wrapped at a desired level of snugness.

13. The protective garment of claim 1, wherein the elastic nonwoven fabric has an elasticity of about 0.5% to about 15%.

14. The protective garment of claim 13, wherein the elastic nonwoven fabric has an elasticity of about 7%.

15. The protective garment of claim 1, wherein the elastic nonwoven fabric comprises first and second outer layers of non-woven polypropylene, and an inner cellulous layer.

16. The protective garment of claim 1, wherein at least one of the first closure and groin closure comprises one of a hook and loop material, a self-adhesive material, and an adhesive material.

17. The protective garment of claim 1, wherein an upper side edge of the second side of the torso portion includes a second closure, the second closure being configured to overlap with the first side of the torso portion to further assist in maintaining the first and second sides of the torso portion wrapped around the respective first and second sides of the animal.

18. A protective garment for an animal, the garment comprising:
a torso portion having a bottom, a first side and a second side, and a torso closure, the first and second sides having respective first and second upper edges and being configured to wrap around respective sides of an animal's torso in an overlapping manner when the garment is worn on the animal with the bottom of the torso portion adjacent a belly of the animal, the torso closure comprising a first closure protruding from the first upper edge and being configured to secure the first and second sides to each other when the protruding portion of the first closure is pressed on the second side of the torso portion;

an elongated groin strip extending rearwardly from a rear of the torso portion bottom, having an end portion and a length sufficient for the groin strip to wrap around a rear end of the animal and overlap at the end portion at least one of the first and second sides when the garment is on the animal, the end portion including a groin closure protruding from an edge of the end portion and configured to secure the elongated groin strip to the torso portion when pressed at the overlap between the groin closure and at least one of the first and second sides at a point forward of a tail of the animal;

the groin strip having a transition portion between the rear of the torso portion and the end portion of the groin strip, the transition portion having an opening therein positioned and sized to permit the animal's tail to pass therethrough and to expose the animal's anus, wherein the animal can freely defecate while the garment is worn;

a first leg sleeve and a second leg sleeve attached to the torso portion, and each of the first and second leg sleeves is configured to be wrapped around the animal's respective rear legs; and a first leg closure on the first leg sleeve and a second leg closure on the second leg sleeve, and the first and second leg closures are respectively configured to maintain the first and second leg sleeves wrapped at a desired level of snugness, wherein at least one of the torso portion and elongated groin strip includes an elastic nonwoven fabric having an elasticity of about 0.5% to about 15%.

19. The protective garment of claim 18, wherein the elastic nonwoven fabric has an elasticity of about 7%.

20. A protective garment for an animal, the garment comprising:

a torso portion having a bottom, a first side and a second side, and a torso closure, the first and second sides having respective first and second upper edges and being configured to wrap around respective sides of an animal's torso in an overlapping manner when the garment is placed on the animal with the bottom of the torso portion adjacent a belly of the animal, the torso closure comprising a first closure at the first upper edge, the first closure being configured to secure the first and second sides to each other along the first upper edge when the first and second sides are overlapping; and an elongated groin strip extending rearwardly from a rear of the torso portion bottom, having an end portion and a length sufficient for the groin strip to wrap around a rear end of the animal and overlap at the end portion at least one of the first and second sides when the garment is on the animal, the end portion including a groin closure configured to secure the elongated groin strip to the torso portion at the overlap between the groin closure and at least one of the first and second sides at a point forward of a tail of the animal;

the groin strip having a transition portion between the rear of the torso portion and the end portion of the groin strip, the transition portion having an opening therein positioned and sized to permit the animal's tail to pass therethrough and to expose the animal's anus, wherein the animal can freely defecate while the garment is worn, wherein at least one of:
  the opening of the transition portion is further configured to expose a urethral orifice of a female animal, wherein the female animal can freely urinate while the garment is worn, or
  the bottom of the torso portion having a bottom opening therein positioned to permit a male animal to freely urinate while the garment is worn.

\* \* \* \* \*